United States Patent
Yoshioka et al.

(10) Patent No.: US 9,041,404 B2
(45) Date of Patent: May 26, 2015

(54) ELECTRIC POWER STORAGE SYSTEM

(75) Inventors: Shoji Yoshioka, Chiyoda-ku (JP); Keita Hatanaka, Chiyoda-ku (JP); Hidetoshi Kitanaka, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 372 days.

(21) Appl. No.: 13/582,204

(22) PCT Filed: Mar. 4, 2010

(86) PCT No.: PCT/JP2010/001504
§ 371 (c)(1),
(2), (4) Date: Aug. 31, 2012

(87) PCT Pub. No.: WO2011/108025
PCT Pub. Date: Sep. 9, 2011

(65) Prior Publication Data
US 2012/0319693 A1    Dec. 20, 2012

(51) Int. Cl.
*G01N 27/416*   (2006.01)
*H02H 3/00*     (2006.01)
*H01M 10/34*    (2006.01)
(Continued)

(52) U.S. Cl.
CPC ............ *H01M 10/441* (2013.01); *H01M 10/34* (2013.01); *H01M 10/482* (2013.01); *H01M 2/1077* (2013.01); *H01M 2/34* (2013.01)

(58) Field of Classification Search
USPC ........ 324/426; 320/116, 120; 429/60; 361/88
See application file for complete search history.

(56) References Cited

U.S. PATENT DOCUMENTS

| | | | |
|---|---|---|---|
| 4,303,877 A | | 12/1981 | Meinhold |
| 4,333,119 A | * | 6/1982 | Schoenmeyr .................. 361/76 |

(Continued)

FOREIGN PATENT DOCUMENTS

| | | |
|---|---|---|
| DE | 10 2008 054 532 A1 | 10/2009 |
| JP | 4-267078 A | 9/1992 |

(Continued)

OTHER PUBLICATIONS

Office Action issued Jun. 19, 2014, by the Chinese Patent Office in corresponding Chinese Patent Application No. 201080065129.0, and an English Translation of the Office Action. (12 pages).

(Continued)

*Primary Examiner* — M'Baye Diao
(74) *Attorney, Agent, or Firm* — Buchanan Ingersoll & Rooney PC

(57) ABSTRACT

When a continuous short circuit occurs between both terminals of a battery pack, fault, destruction and rupture of the battery can occur. Further, when a momentary short circuit occurs, a user may continue to use, without knowing thermal and electrical damage to the batteries, and reliability for the batteries is impaired, To overcome the problem, in a battery pack configured by connecting a plurality of storage batteries in series, at least one first storage battery is included which has a low capacity compared to second storage batteries during high-rate discharge, and the first storage battery undergoes polarity inversion during external short circuit, thereby preventing the other batteries from becoming damaged. There are also included a detector that detects voltage of the first storage battery, and a fault signal generator that generates an output fault signal when a voltage detected by the detector inverses.

12 Claims, 3 Drawing Sheets

(51) Int. Cl.
*H01M 10/44* (2006.01)
*H01M 10/48* (2006.01)
*H01M 2/10* (2006.01)
*H01M 2/34* (2006.01)

(56) References Cited

U.S. PATENT DOCUMENTS

| | | | |
|---|---|---|---|
| 5,683,827 A | | 11/1997 | Yu |
| 5,821,601 A | * | 10/1998 | Yamamoto et al. ............ 257/579 |
| 6,051,954 A | * | 4/2000 | Nagao et al. .................. 320/101 |
| 6,822,423 B2 | * | 11/2004 | Yau et al. ...................... 320/122 |
| 6,822,425 B2 | * | 11/2004 | Krieger et al. ................ 320/139 |
| 7,205,772 B2 | * | 4/2007 | Naidu et al. .................. 324/536 |
| 7,259,537 B2 | * | 8/2007 | Hauenstein et al. .......... 320/103 |
| 7,768,236 B2 | * | 8/2010 | Takamura et al. ............ 320/134 |
| 7,847,557 B2 | * | 12/2010 | Yun et al. ...................... 324/430 |
| 2007/0018615 A1 | * | 1/2007 | Graf et al. ..................... 320/160 |
| 2008/0285193 A1 | | 11/2008 | Watanabe et al. |

FOREIGN PATENT DOCUMENTS

| | | |
|---|---|---|
| JP | 07-078639 A | 3/1995 |
| JP | 7-078639 A | 3/1995 |
| JP | 2000-150002 A | 5/2000 |
| JP | 2001-346339 A | 12/2001 |
| JP | 2003-178808 A | 6/2003 |
| JP | 2004-095400 A | 3/2004 |
| JP | 2008-289296 A | 11/2008 |
| WO | 2009/124826 A1 | 10/2009 |

OTHER PUBLICATIONS

Extended European Search Report dated Oct. 10, 2013, issued by the European Patent Office in the corresponding European Application No. 10846936.2. (5 pages).

International Search Report (PCT/ISA/210) issued on May 18, 2010, by the Japanese Patent Office as the International Searching Authority for International Application No. PCT/JP2010/001504.

* cited by examiner

| amount of electrolyte solution | rated-current discharging capacity | high rate discharging capacity | resistance value at end of discharging |
|---|---|---|---|
| 105(%) | 99.8% | 96.0% | 0.002 Ω |
| 100(%) | 100.0% | 95.1% | 0.002 Ω |
| 95(%) | 100.1% | 94.8% | 0.002 Ω |
| 90(%) | 99.6% | 60.1% | 0.1 Ω |
| 85(%) | 97.5% | 25.0% | 0.8 Ω |

| salt concentration mol/L | rated-current discharging capacity | high rate discharging capacity | resistance value at end of discharging |
|---|---|---|---|
| 1.0 | 100.0 % | 95.1 % | 0.002 Ω |
| 0.9 | 97.2 % | 51.5 % | 0.15 Ω |
| 0.8 | 90.1 % | 22.1 % | 0.9 Ω | ical field

The present invention relates to an electric power storage system that uses a battery pack.

BACKGROUND ART

Battery packs that are mounted on apparatuses, vehicles or the like are configured by combining a plurality of storage batteries in series or parallel in order to obtain a voltage or capacity needed for the apparatuses. Across output terminals of the battery pack, a load such as a semiconductor device or an electric motor is connected via a device such as a voltage converter. In situations where a high voltage is needed in accordance with requirements of the load or where low current is used to obtain necessary electric power, storage batteries are connected in series thereby increasing a voltage of the battery pack. In situations where an apparatus needs to be operative for a long period of time, the number of parallel rows of storage batteries is increased to augment the capacity. In this way, a combination of series/parallel connection is determined according to factors such as requirements of apparatuses or the like that serves as loads.

Many ideas have been proposed for a battery pack. In, for instance, Patent Reference 1, it is described that in a process where a plurality of storage batteries fabricated is assembled into a battery pack, a minimum capacity battery is selected for control operation, and as a representative of the batteries in the battery pack. In Patent Reference 2, an idea is incorporated by which an over-discharged battery in a battery pack is detected early.

One problem with a battery pack lies in that when an external short-circuit occurs in an apparatus connected to the battery pack, the short circuit current causes the storage batteries to be heated and thereby damaged.

To take measures, conventionally a thermistor, a voltage sensing circuit and the like that achieve a current interruption capability to ensure safety is provided in an electric power storage system that uses the battery pack, and current interruption capability is incorporated that interrupts an electric current circuit in response to a control signal.

For instance, a small type battery pack such as in a portable device, if used, produces less current and its switch for operating in an emergency is also of small type; thus, it is sufficiently possible to cause the small type battery pack to have the current interruption capability such as above.

PRIOR ART REFERENCE

Patent Reference

[Patent Reference 1] Japanese Unexamined Patent Application Publication 2003-178808 (pages 3 through 5, and FIG. 2)

[Patent Reference 2] Japanese Unexamined Patent Application Publication 2000-150002 (pages 2 through 4, and FIG. 1)

SUMMARY OF THE INVENTION

Problem that the Invention is to Solve

In an electric power storage system in which storage batteries are charged or discharged with a current of, for instance, several hundreds amperes, the provision of the above current interruption capability causes the system to increase in size to a great extent.

The present invention is made in light of such a problem, and an object of the invention is to provide a battery pack that, while preventing the system from becoming large, minimizes damage to a storage battery due to an external short-circuit.

Means for Solving the Problem

An electric power storage system according to the present invention includes a battery pack configured with a first storage battery and a second storage battery that are connected in series, in which a starting point of a diffusion-limited region of the first storage battery is smaller in current than that of the second storage battery; a detector that detects a voltage of the first storage battery; and a fault signal generator that generates an output fault signal when the voltage detected by the detector inverses.

Advantageous Effect of the Invention

In a battery pack according to the present invention, a mechanism can be provided which minimizes damage due to an external short-circuit.

MODES FOR CARRYING OUT THE INVENTION

Embodiment 1

Figure 1:
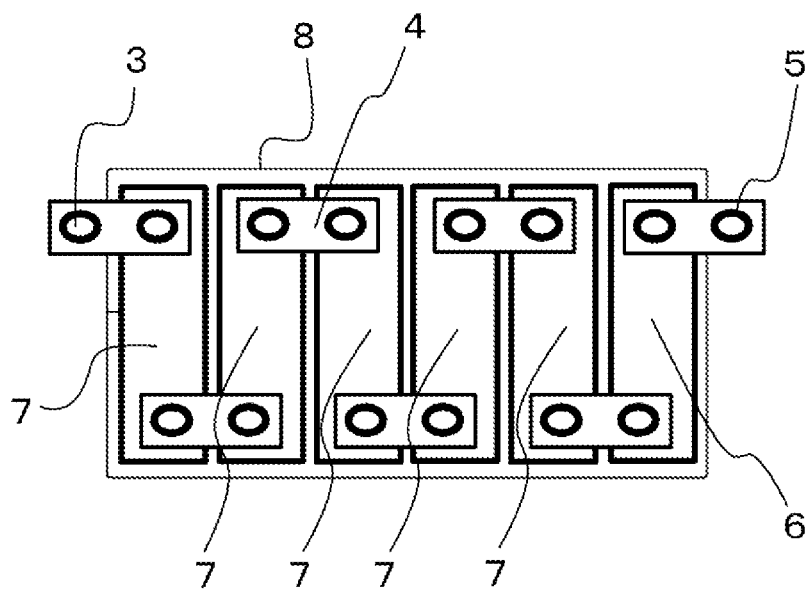
FIG. 1 is a layout diagram of a battery pack according to Embodiment 1 of the present invention.

FIG. 1 is a layout diagram of a battery pack according to Embodiment 1 of the present invention. In FIG. 1, the battery pack according to Embodiment 1 of the present invention includes a positive terminal 3 of the battery pack, an electroconductive metal plate 4 of copper plated with nickel, a negative terminal 5 of the battery pack, a first storage battery 6, and a plurality of second storage batteries 7. Each storage battery is connected together in series by means of the conductive metal plate 4, and housed in a row in a battery pack casing 8. Further, each storage battery is disposed so that its positive and negative terminals are located alternately up and down in the figure, whereby a current path, established by the conductive metal plate 4 that connects adjacent storage batteries horizontally in the figure, is designed to be short.

When a plurality of storage batteries that is not uniform in capacity is assembled into a battery pack, the voltage of a storage battery having the minimum capacity reaches earliest the cutoff voltage during discharge. Thus, the capacity of the battery pack becomes equivalent to the capacity of this storage battery. Further, when a plurality of storage batteries that is not uniform in direct current internal resistance is assembled into a battery pack, each battery voltage causes variations during charging, thereby impairing in some cases the material durability of a storage battery having large internal resistance. Therefore, in order to make full use of the capabilities of the storage batteries and enable the battery pack to be used for a long time, it is preferable that storage batteries equal in capacity and internal resistance as much as possible in a rated current be configured into a battery pack.

For this purpose, the first storage battery 6 according to Embodiment 1 of the present invention is made not different in capacity from the second storage batteries 7, in the rated current, and only when the first battery 6 is discharged with a large amount of current, such as at the time of short-circuit, the internal resistance is made high, causing reduction in capacity. Further, the internal resistance and capacity of the second storage batteries 7 is made not varied to a great extent by variation in current.

By doing this way, when a low-resistance short-circuit occurs between the positive terminal 3 and the negative terminal 5 in the battery pack as configured in FIG. 1, only the first storage battery 6 is greatly polarized, thereby causing polarity inversion, that is, whose voltage changes from positive to negative. This stops the current from flowing, and a voltage across the positive terminal 3 and the negative terminal 5 is substantially zero because of the external short-circuit. Thus, the second storage batteries 7, while exhibiting positive voltages, are in the stable condition in which only current of the rated value or less flows, enabling damage to the second storage batteries 7 to be minimized.

The first storage battery 6 is disposed at the end that is nearest the negative terminal 5 in the battery pack casing 8. Because in the most cases a storage battery having undergone polarity inversion cannot be used, the first storage battery 6 that will undergo polarity inversion is disposed at the endmost position of the battery pack casing 8, thereby facilitating replacement of the first storage battery 6 even in situations where the battery pack is incorporated into the electric power storage system. Even when on rare occasions the first storage battery 6 generates heat and if the first storage battery 6 is disposed at the endmost position, the influence to the second storage batteries 7 is minimized.

Next, a method of fabricating storage batteries according to Embodiment 1 of the present invention will be described. Generally, the internal resistance of a storage battery does not vary to a great extent even if a value of current flowing through the storage battery varies; however, storage batteries can be fabricated such that the internal resistance increases to a great extent when an extremely large amount of current flows through the storage battery (high rate discharge). Storage batteries having increased internal resistance during high rate discharge are chosen by a method of separating from a plurality of storage batteries fabricated and are obtained by a method of fabricating storage batteries that have high resistance during high rate discharge. The latter will be further described herein.

Given that, assigned as n is the total number of the storage batteries of the battery pack formed by combining together one first storage battery 6 and n−1 second storage batteries 7; the rated current value for the first storage battery 6 and the second storage batteries 7, as I; and the internal resistance of the first storage battery 6 and the second storage batteries 7, and a voltage of each storage battery at the time when the rated current flows therethrough, as R and V, respectively, then resistance Rx at the time when an external short-circuit occurs at the first storage battery 6 is expressed by the following equation:

$$Rx = n \times V/I - (n-1) \times R \qquad \text{Equation 1}$$

In this case, the internal resistance R during normal operation is generally very small; thus, if internal resistance during high rate discharge of a storage battery undergoing polarity inversion is a value of $n \times V/I$ or more, it is preferable for the above first storage battery 6 subject to polarity inversion. Consequently, it is preferable for the first storage battery 6 that the internal resistance during the external short-circuit be 0.8 ohms or more when, for a battery pack of 6 batteries in series, the voltage of each storage battery is 4 V and the rated current is 30 A, for instance.

The following description will be provided assuming that a lithium-ion battery is used as a storage battery constituting the battery pack according to Embodiment 1 of the present invention; however, this battery may be replaced with a battery such as a nickel metal hydride battery, an alkaline storage battery, a nickel-cadmium battery, a lead-acid storage battery, an electric double-layer capacitor, or a lithium-ion capacitor.

A method of fabricating a lithium-ion battery for use as the battery pack according to Embodiment 1 of the present invention will be described below. The positive electrode of the lithium-ion battery is made by coating with a slurry an aluminum plate (or aluminum foil)—a positive electrode current collector—drying the slurry, and press forming the slurry-coated aluminum plate. The slurry is prepared by dissolving and dispersing lithium cobalt oxide, acetylene black and PVDF binder in solution. The negative electrode thereof is made by coating with another slurry a copper plate (or copper foil)—a negative electrode current collector—drying the other slurry and press forming the slurry-coated copper plate. The other slurry is prepared by dissolving and dispersing graphite and SBR binder in solution.

A battery element is made by having a polyolefin microporous membrane between both electrodes, and injecting between each electrode and the intervening membrane an electrolyte solution that has a salt of $LiPF_6$ dissolved in a solvent prepared by mixing together ethylene carbonate (EC) and diethyl carbonate (DEC) by a volume ratio of 4:6, each having a water content adjusted to 10 ppm or less. After the battery element is inserted into a stainless or aluminum container, pre-charging is performed for gas emission for 30 minutes with a current density of 3 $A/cm^2$ per geometrical area of the electrode. Thereafter, in the atmosphere of inert gas, the container and its lid are welded together by laser welding and the container is sealed, thus fabricating the lithium-ion battery.

The lithium battery with a capacity of 20 Ah, thus fabricated was charged for three hours at a 1 C current rate in an environment controlled at a temperature in the neighborhood of 25 degrees C., and after stopping its charge for a period of 10 minutes, a value of the capacity was measured at a 30 A discharge, and then the value measured is defined as the rated-current discharge capacity. The high rate discharge capacity was measured under the same charge condition and by setting a discharge current value at 150 A and 300 A.

Figure 2:
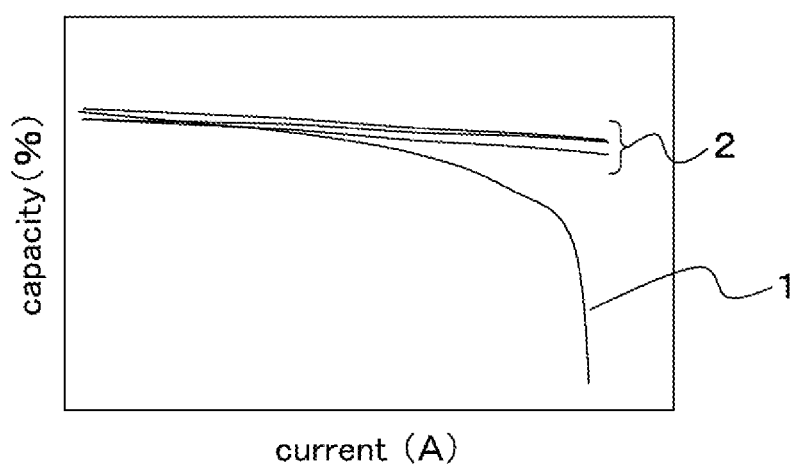
FIG. 2 is a graph showing an example of a capacity characteristic of a storage battery according to Embodiment 1 of the present invention.

FIG. 2 is a graph showing an example of capacity characteristics of the lithium-ion battery, measured under the above conditions. A curve 1 shows a capacity characteristic of a lithium-ion battery whose capacity lowers to a great extent during high rate discharge occurring when the current value is large. This lithium-ion battery is used as the first storage battery. The other curves 2 show capacity characteristics of lithium-ion batteries that provide predetermined capacity even during high rate discharge. These lithium-ion batteries are used as the second storage batteries 7.

Referring to FIG. 2, a starting point of a diffusion limited region of the first storage battery 6 is smaller in current than those of the second storage batteries 7, and when the value of flow current increases, the capacity of the first storage battery 6, shown by the curve 1, decreases more sharply than those of the second storage batteries 7, shown by the curves 2.

In the battery pack according to Embodiment 1 of the present invention, a large amount of current flowing during external short-circuit thereby causes the first storage battery 6 to undergo polarity inversion, while the voltage of each second storage battery 7 remains near its open circuit voltage.

Next, a method of fabricating a storage battery that causes only a capacity characteristic during high rate discharge to lower without changing the capacity characteristic at the rated current will be described. As described previously, the capacity of a battery having the lowest capacity in the battery pack formed of a plurality of batteries connected in series is that of the battery pack. For that reason, it is preferable that a capacity characteristic in the rated current be lowered as little as possible, and only the characteristic during high rate discharge be lowered.

In order to reduce the capacity, it will suffice if the internal resistance is increased. Further, since, as will be described next, the internal resistance during high rate discharge largely reflects mass transfer resistance in the interior of the battery, it will suffice if the mass transfer resistance in the interior of the battery is increased.

In the interior of the battery, electrode reactions and their subsequent mass transfer occur during charge or discharge. The mass transfer largely represents a transfer of the lithium ion in a negative or positive electrode active material crystal and transfers of the positive and negative ions in the electrolyte solution. Since the drive force for such mass transfers is generated largely by difference in ion concentration of the electrolyte, the diffusion speed of ions does not satisfy a diffusion speed required during charge or discharge with a large amount of current, thereby increasing mass transfer resistance—an apparent resistance. This significantly occurs at the end of discharge. A region of the current value where such a phenomenon occurs is called a diffusion limited region. Therefore, the increase of the mass transfer resistance in the interior of the battery leads to reduction of the high rate discharge capacity.

When the first storage battery and the second storage batteries are of the same type (lithium-ion battery), there are three methods of increasing the mass transfer resistance in the interior of the battery. These methods will be described below. The first one is a method of decreasing an amount of electrolyte solution. An example thereof is that an amount of electrolyte solution in the first storage battery 6 is made smaller than an average amount of the electrolyte solution in the second storage batteries 7.

Figures 3, 4, 5:
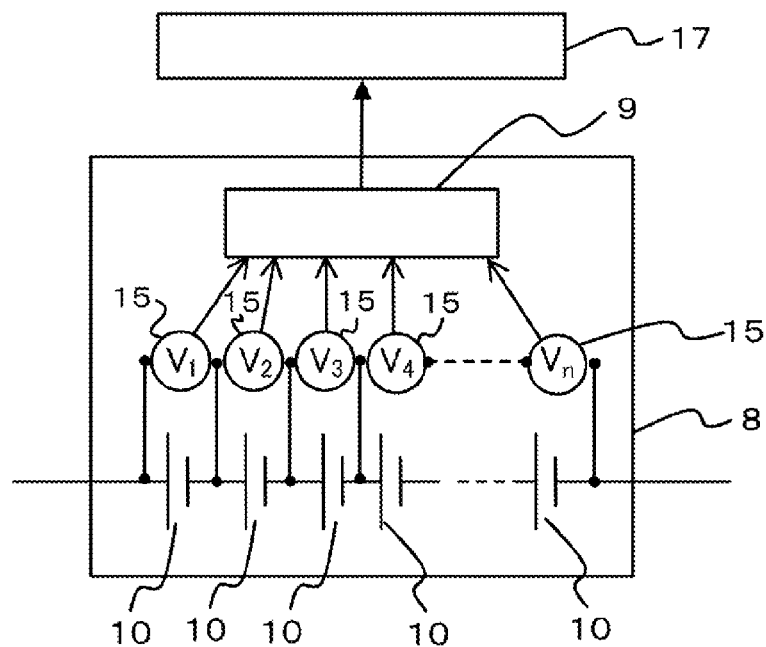
FIG. 3 is a table showing a capacity to an amount of electrolyte solution of a lithium-ion battery.
FIG. 4 is a table showing a capacity to a salt concentration of a lithium-ion battery.
FIG. 5 is a partially schematic diagram of a configuration of an electric power storage system, showing as a comparison example a battery pack according to Embodiment 2 of the present invention.

The electrolyte solution is typically impregnated into cavities of the battery element. The 100% amount of the electrolyte solution means a condition in which the solution is fully filled. FIG. 3 is a table showing capacity with respect to the amount of the electrolyte solution in the lithium-ion battery. Referring to FIG. 3, the rated-current discharge capacity is a value of the capacity generated when the discharge current is set to 30 A, and the high rate discharge capacity is a value of the capacity generated when the discharge current is set to 300 A. FIG. 3 also shows resistance values at the end of discharge. If the amount of the electrolyte solution in the first storage battery 6 is reduced to 90% or less, the high rate discharge capacity can be sufficiently reduced, as shown in FIG. 4.

The second method of increasing the mass transfer resistance in the interior of the battery is that of lowering a concentration of electrolyte solution. In other words, the concentration of electrolyte solution in the first storage battery 6 is made lower than that in each of the second storage batteries 7.

The electrolyte solution in the lithium-ion battery typically contains about 1 mol/L of a salt of $LiPF_6$, which is an electric charge carrier, in an organic electrolyte solution. FIG. 4 is a table showing capacity with respect to a salt concentration in the lithium-ion battery.

Referring to FIG. 4, the rated-current discharge capacity is a value of capacity generated when the discharge current is set to 30 A, and the high rate discharge capacity is that generated when the discharge current is set to 300 A. FIG. 4 also shows resistance values at the end of discharge. By lowering the salt concentration in the first storage battery 6 to, for instance, 0.9 or less, the high rate discharge capacity can be sufficiently reduced, as shown in FIG. 3.

The third method of increasing the mass transfer resistance in the interior of the battery is that the mass transfer resistance can be increased by promoting the growth of a solid electrolyte interface (SEI) layer, in an interface of the electrolyte solution, which makes contact with a graphite negative electrode active material, other than by controlling the characteristic of the electrolyte solution.

A method of promoting growth of SEI will be described. A battery fabricated is charged, with a constant current, up to its fully charged level. The fully charged battery is retained within a constant temperature bath of 60 degrees C. for a period of 24 hours (aging), whereby the SEI layer is thickly created over a graphite surface layer where lithium is intercalated. During discharge, this increases the mass transfer resistance existing when lithium ions diffuse through the SEI layer and migrate from the structure of the active material phase to the electrolyte solution. This method can reduce the high rate discharge capacity of the first storage battery 6.

As described above, the battery pack according to Embodiment 1 of the present invention includes a specific battery— the storage battery 6—having a relatively low capacity-current characteristic, and a feature thereof is that polarity inversion of the first storage battery 6 by a large amount of current flowing during external short-circuit, thus avoiding the second storage batteries 7 from becoming damaged.

In addition, since the battery pack autonomously interrupts current flowing therethrough, the batteries can be prevented from becoming damaged by self-heating due to the large-amount-of-current discharge, or apparatuses connected to the batteries can be prevented from becoming failed, even in situations where sensors do not function properly, such as when a short-circuit occurs between both end electrodes of the battery pack during fabrication process, or when the external short-circuit occurs such as when the battery is integrated into a system after the fabrication, when an external load is connected to the battery pack, or prior to starting up the system.

Further, unlike a circuit or the like that achieves a conventional current interruption capability, situations are eliminated in which a user continues to use the battery without knowing a damaged battery, even when, although short-time short circuit causes the battery to be heated to a high temperature and thereby damaged, the damaged battery recovers its voltage immediately.

In addition, since devices, such as a thermistor and a voltage sensing circuit that are disposed outside the battery pack and achieve a current interruption capability, are unnecessary, an electric power storage system to which the battery pack is applied can be reduced in size and weight.

Note that a plural of first storage batteries 6 may be used. During the external short circuit, the plurality of first storage batteries 6 is sacrificed; however, the second storage batteries 7, other than those, can be protected.

Embodiment 2

FIG. 5 is a partially schematic diagram of a configuration of an electric power storage system showing a comparison example of a battery pack according to Embodiment 2 of the present invention. Referring to FIG. 5, storage batteries are designated by 10; voltmeters, each of which measures respective voltages of the batteries, by 15; a polarity inversion detector that detects polarity inversion of each battery by voltage variations in response voltage signals from the voltmeters, by 9; and a fault signal generation and memory storage unit that generates a fault signal and stores a fault history when the unit receives a polarity inversion signal sent from the polarity inversion detector 9, by 17.

If the battery pack is incorporated into the electric power storage system and operated by supplying power from an external auxiliary power supply, and when the external short circuit occurs, the voltage of each storage battery can be measured with each of the voltmeters 15, as shown in FIG. 5. Each voltmeter 15 delivers to the polarity inversion detector 9 a voltage signal according to the result of measurement and the polarity inversion detector 9 can determine from the voltage signal as to which storage battery has undergone polarity inversion.

By receiving a signal that communicates occurrence of polarity inversion from the polarity inversion detector 9, the fault signal generation and memory storage unit 17 can issue a fault signal for communicating a fault to an external apparatus and also store a history of the polarity inversion. However, in a state prior to incorporation of the battery pack into the electric power storage system, power required for monitoring the battery pack, such as for issuance of the fault signal, storage of the history of polarity inversion and the like, needs to be fed by the power of the battery pack itself.

Figure 6:
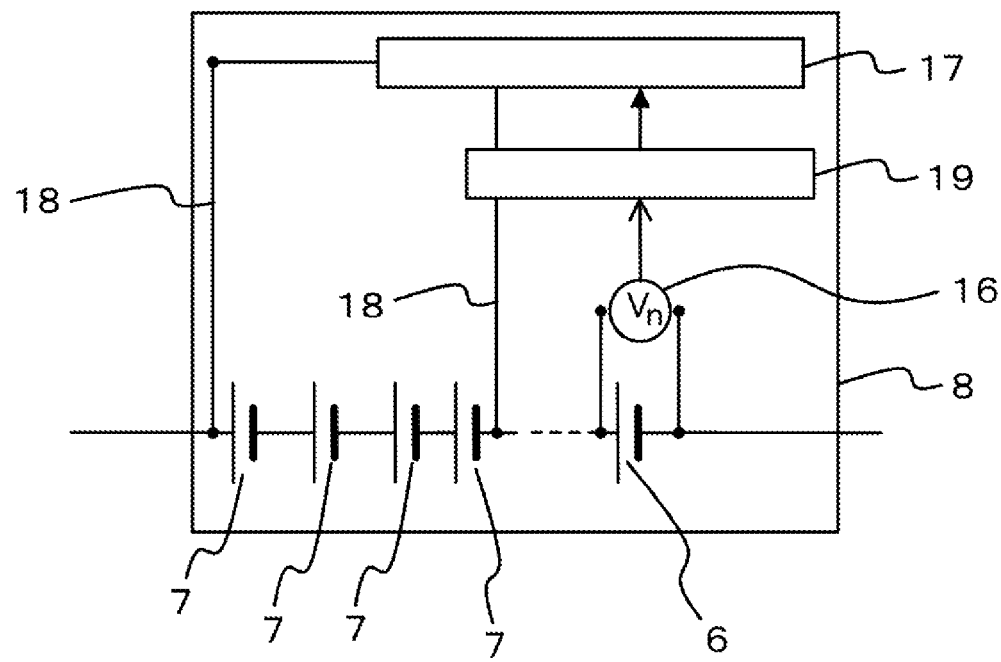
FIG. 6 is a configuration diagram of the battery pack according to Embodiment 2 of the present invention.

FIG. 6 is a schematic diagram of a battery pack according to Embodiment 2 of the present invention. The difference between the battery pack according to Embodiment 1 and that according to Embodiment 2 is that there are provided a voltmeter 16, a polarity inversion detector 19, the fault signal generation and memory storage unit 17 and a power supply cable 18. The rest of the configuration is the same as that for the battery pack according to Embodiment 1. The same reference numeral applies to the same components, and the corresponding description will not be provided herein.

A battery that undergoes polarity inversion among batteries in the battery pack is the storage battery 6, disposed in a specific location, which has high resistance during high rate discharge. Consequently, if a voltage of the battery is monitored as a representative, the presence or absence of polarity inversion, i.e., the presence or absence of an external short circuit can be detected. Further, since the second storage batteries 7 other than this specific battery 6 do not undergo polarity inversion during short circuit, they can be utilized as a drive power supply for detection of polarity inversion, generation and memory-storage of a fault signal. For this reason, the battery pack enables a short circuit to be detected and stored even when the system is inoperative.

The operation will be described next. When the first storage battery 6 undergoes polarity inversion, the voltmeter 16 that measures the voltage of the first storage battery 6 transmits a voltage signal to the polarity inversion detector 19, communicating occurrence of the polarity inversion. The polarity inversion detector 19 thereby detects the polarity inversion, to send a polarity inversion signal to the fault signal generation and memory storage unit 17. The fault signal generation and memory storage unit 17, having received the polarity inversion signal, generates a fault signal for communicating the fault to the external apparatus, and stores history data of the polarity inversion. Note that devices, such as the polarity inversion detector 19 and the fault signal generation and memory storage unit 17, can be powered through the power supply cable 18 from the second storage batteries 7 that do not undergo polarity inversion.

As described above, the battery pack according to Embodiment 2 of the present invention can detect a short circuit and store it in the memory even when the system is inoperative.

Embodiment 3

Figure 7:
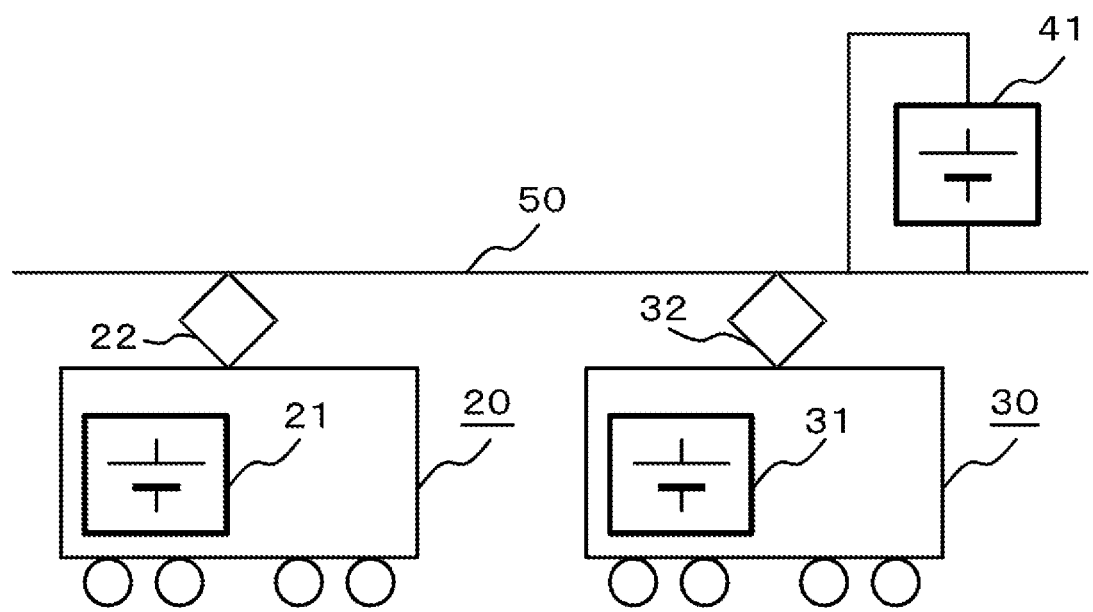
FIG. 7 is a conceptual diagram of a regeneration energy storage system for an electric railcar according to Embodiment 3 of the present invention.

The battery pack described in Embodiment 1 and Embodiment 2 is applicable to a regeneration energy storage system for electric railcar. FIG. 7 is a conceptual diagram of the regeneration energy storage system for electric railcar, showing an example of the application.

A regeneration energy storage system for electric railcar according to Embodiment 3 includes an overhead line 50 for feeding electric power from a power substation, an on-ground electric power storage system 41 connected to the overhead line 50, an electric railcar 20 having an onboard electric storage system 21 and a pantograph 22, and an electric railcar 30 having an onboard electric storage system 31 and a pantograph 32, as shown in FIG. 7. The on-ground electric power storage system 41, the onboard electric storage system 21 and the onboard electric storage system 31 each have the battery pack according to Embodiment 2 incorporated therein.

The feature of an electric railroad car is that regenerated power obtained via an overhead line during braking is reused at another car, and energy-saving can thereby be made. To maximize this advantage, it is preferable that the power regenerated during braking of the car be consumed via the overhead line by another power running electric railcar. However, if a power running railcar is located far away from a regenerative railcar, or the power running railcar cannot sufficiently consume regenerated power because of the amount of the regenerated power being large, an overhead line voltage increases. In such a case, braking energy is partially wasted as a heat so that the overhead line voltage is less than a certain level.

For that reason, in the regeneration energy storage system for electric railcar according to Embodiment 3, in order not to waste the energy, the regenerated power is collected and stored in the on-ground electric power storage system 41, the onboard electric power storage system 21 and the onboard electric power storage system 31.

Operation will be described next. Typically, the regenerated power that is generated when the electric railcar 20 is braked is supplied through the overhead line to, and consumed by, the electric railcar 30.

On the other hand, when the electric railcar 20 is braked, and if the electric railcar 30 is located far away from the electric railcar 30, or the electric railcar 30 cannot sufficiently consume a regenerated power because of the amount of the regenerated power being large, the regenerated power during braking is partially or entirely collected and stored in the storage device 21. The stored power can be taken from the stored device and used, as required.

As described above, the regeneration energy storage system for electric railcar according to Embodiment 3 can store the regenerated power and makes effective use of it.

Note that the on-ground electric power storage system 41, the onboard electric power storage system 21 and the onboard electric power storage system 31 may be configured such that when an onboard battery pack fails, a signal for communicating the fault of the battery pack is issued to a device, such as a safety device, or stored. This enhances reliability and safety of the system.

REFERENCE NUMERALS

3 positive terminal of battery pack
4 electro-conductive metal
5 negative terminal of battery pack
6 first storage battery
7 second storage battery
8 battery pack casing
17 fault signal generation and memory storage unit
18 electric power supply cable
19 polarity inversion detector
20 electric railcar
21 onboard electric power storage system
22 pantograph
30 electric railcar
31 onboard electric power storage system
32 pantograph
41 on-ground electric power storage system
50 overhead line

The invention claimed is:

1. An electric power storage system, comprising:
   a battery pack configured by connecting in series
      at least one first rechargeable storage battery; and
      at least one second rechargeable storage battery, wherein a capacity of the first storage battery becomes lower than a capacity of the second storage battery during a short-circuit, and a polarity of the first storage battery is inverted;
   a detector that detects a voltage of the first storage battery; and
   a fault signal generator that generates an output fault signal when the voltage detected by the detector inverses.

2. The electric power storage system of claim 1, wherein an amount of an electrolyte solution in the first storage battery is smaller than an average amount of the electrolyte solution in the second storage battery.

3. The electric power storage system of claim 2, wherein the first and second storage batteries are lithium-ion batteries.

4. An electric power storage system of claim 2, further comprising a fault history memory storage unit that stores a fault history.

5. The electric power storage system of claim 1, wherein a salt concentration of the electrolyte solution in the first storage battery is lower than that of the electrolyte solution in the second storage battery.

6. The electric power storage system of claim 5, wherein the first and second storage batteries are lithium-ion batteries.

7. An electric power storage system of claim 5, further comprising a fault history memory storage unit that stores a fault history.

8. The electric power storage system of claim 1, wherein the first and second storage batteries are lithium-ion batteries.

9. An electric power storage system of claim 1, further comprising a fault history memory storage unit that stores a fault history.

10. An electric power storage system, comprising:
    a battery pack configured by connecting in series
       a first rechargeable storage battery, whose rated current is assigned as I and whose voltage generated when the rated current flows through the battery is assigned as V, and
       a plurality of second rechargeable storage batteries, whose rated current is assigned as I and, when the rated current flows through a second storage battery of the plurality of second storage batteries, the voltage generated is assigned as V, the first storage battery and the plurality of second storage batteries being connected in series;
    wherein an internal resistance R of the first storage battery becomes greater than an internal resistance R of each of the plurality of second storage batteries during a short-circuit, and a polarity of the first storage battery is inverted;
    a detector that detects a voltage of the first storage battery; and
    a fault signal generator that generates an output fault signal when the voltage detected by the detector inverses.

11. The electric power storage system of claim 10, wherein the first and second storage batteries are lithium-ion batteries.

12. An electric power storage system of claim 10, further comprising a fault history memory storage unit that stores a fault history.

* * * * *